United States Patent [19]

Dünwald et al.

[11] 4,281,095

[45] Jul. 28, 1981

[54] COATING COMPOSITIONS OBTAINED BY REACTING AMINO CARBOXYLIC ACIDS DERIVATIVES WITH POLYISOCYANATES AND COMPOUNDS CONTAINING CARBOXYLIC GROUPS TO PRODUCE POLYMERS CONTAINING HYDANTOIN RINGS AND AMIDE GROUPS

[75] Inventors: Willi Dünwald, Leverkusen; Jürgen Lewalter, Odenthal; Rudolf Merten, Leverkusen; Ludwig Rottmaier, Odenthal; Bernhard Schulte; Karl-Heinrich Meyer, both of Krefeld, all of Fed. Rep. of Germany

[73] Assignee: Bayer Aktiengesellschaft, Leverkusen, Fed. Rep. of Germany

[21] Appl. No.: 100,633

[22] Filed: Dec. 5, 1979

[30] Foreign Application Priority Data

Dec. 16, 1978 [DE] Fed. Rep. of Germany ....... 2854412

[51] Int. Cl.$^3$ .............................................. C08G 18/06
[52] U.S. Cl. ....................................... 528/49; 528/48; 528/52; 528/80
[58] Field of Search ....................... 528/48, 49, 52, 80

[56] References Cited

U.S. PATENT DOCUMENTS

| 3,122,451 | 2/1964 | Bunge et al. ........................ 528/296 |
| 3,397,253 | 8/1968 | Merten et al. ...................... 525/395 |
| 3,684,774 | 8/1972 | Merten et al. ..................... 260/309.5 |
| 3,705,874 | 12/1972 | Merten et al. ................ 260/30.8 DS |
| 4,169,931 | 10/1979 | Rottmaier et al. ..................... 528/49 |

FOREIGN PATENT DOCUMENTS

890534  3/1962  United Kingdom .

*Primary Examiner*—Maurice J. Welsh
*Attorney, Agent, or Firm*—Connolly and Hutz

[57] ABSTRACT

In non-phenolic solvents soluble Polyamid-hydantoins optionally containing ester and/or imide and/or isocyanurate groups are obtained by reacting polyisocyanates with polyfunctional amino carboxylic acid derivatives and a compound containing at least a carboxylic group preferably in the presence of a non-phenolic solvent.

9 Claims, No Drawings

COATING COMPOSITIONS OBTAINED BY REACTING AMINO CARBOXYLIC ACIDS DERIVATIVES WITH POLYISOCYANATES AND COMPOUNDS CONTAINING CARBOXYLIC GROUPS TO PRODUCE POLYMERS CONTAINING HYDANTOIN RINGS AND AMIDE GROUPS

It is known that coatings and films may be produced from a variety of starting materials and combinations thereof which have to meet various requirements both in regard to their ability to withstand stressing in practical application. Where the coatings and films are used for electrical insulation purposes, a high electrical insulating capacity and, to an increasing extent, high resistance to heat and thermal stressing are further requirements which have to be satisfied.

The first step towards improving thermal stability was made with terephthalic acid polyesters of the type described in Belgian Pat. No. 557, 685.

The incorporation of isocyanurate structures represented a further improvement. By combining hydroxyl group-containing polymers of terephthalic acid and/or isophthalic acid and/or amino-isophthalic acid with isocyanurate polyisocyanates on the substrate the coating contains the quantities of isocyanurate structures required for the particular application (German Auslegeschrift No. 1,179,319).

In addition to using isocyanurate polyisocyanates, isocyanurate structures may also be incorporated by using cyanuric acid aryl esters (German Auslegeschrift No. 1,096,031).

Further improvements are obtained by using, in addition to the above-mentioned dicarboxylic acids, tricarboxylic acids, such as the isomeric 1,2,3- and/or 1,2,4- and/or 1,3,5,-benzene tricarboxylic acids together with diamines and polyols (German Auslegeschrift No. 1, 067, 549), so that in addition to the ester groups, the stoved lacquer film also contains isocyanurate, amide and imide groups in its structure.

Solution of these polymers may only be prepared using a very few solvents which, moreover, are not normally used for lacquers.

For example, polyamides, terephthalic and isophthalic acid polyesters with and without imide groups are only soluble in phenolic solvents providing they have the high molecular weights required for obtaining optimal lacquer properties.

Polyamide imides and polyimides are normally only soluble in nitrogen-containing liquids, such as N-methyl pyrrolidone, dimethyl formamide and diethyl formamide. These solvents are not physiologically harmless and lead, inter alia, to oxides of nitrogen, if, after stoving, they are burnt for the purposes of generating energy or reducing pollution.

Accordingly, one particular advantage of polyhydantoins when used for insulating lacquers, is that they do not require such nitrogen-containing solvents. They can be applied from solutions in phenolic solvents. However, physiological problems and excessive pollution of the environment are obstacles to the use of these solvents.

Another disadvantage of the hitherto known solvents lies in the fact that only a few substrates show adequate resistance to these strong solvents when they are coated with binder films of this type.

The differences in solubility between the polyamide imides and polyimides, on the one hand, and the polyamides, polyesters, polyester imides and polyhydantoins, on the other hand, made it impossible to obtain solution mixtures leading to optimal properties of the resulting lacquer film by mixing the respective pure polymer solutions. To obtain optimal film properties, the structures specific to the individual properties have to be adapted to one another in certain quantitative ratios. These quantitative ratios cannot be arbitrarily selected. The nitrogen-containing solvents and phenol or cresol or homologues thereof interact and thus cause changes in solubility which in turn lead to precipitations affecting the individual polymer components to different extents. In this case, that part of the polymer which remains in solution is no longer present in the intended quantitative ratio assuming that adequate quantities of the substances do in fact remain in solution.

However, if the properties of the resulting film are to be effectively controlled, the structures recognised as essential to certain properties of the lacquer film must be maintained.

In general, an important requirement governing the properties of the film is that there should be good contact between the lacquer solution and the substrate. Thus a uniform levelling during the lacquering process and, subsequently a firm adhesion of the hardened lacquer film is possible. This effect is obtained by the addition of a polyhydantoin. In addition polyhydantoins produce high resistance to hydrolysis and high temperature resistance otherwise known as "burn-out resistance". They also have a favourable effect on flexibility.

The incorporation of imido groups produces an improvement in thermal shock resistance and a subsequent rise in the curve of the tan δ function in dependence upon temperature.

In general, the amide-imide groups improve the long-term thermal stability and sliding properties of the lacquered wires.

By incorporating isocyanurate structures, it is possible to control hardness, resistance to solvents and thermoplastic behaviour.

German Offenlegungsschrift No. 2,522, 386 describes the production of polyester imides in phenolcresol-free solvents. However, it is not possible to combine these lacquer solutions with a quantity of polyhydantoin sufficient for obtaining the required effect because the polyhydantoins are not soluble in the solvents used. The same applies to polyamide imides and polyimides.

It has now surprisingly been found that it is possible to synthesize polymers which are not only linked by hydantoin groups, but also all the other structures recognised as essential for a temperature-resistant coating or film, but which at the same time are soluble not only in nitrogen-containing solvents, such as N-methyl pyrrolidone and dimethyl formamide, and in phenol, cresol and homologues thereof, but also in a wide range of physiologically more favourable solvents, by reacting polyfunctional amino carboxylic acid derivatives with organic polyisocyanates in the presence of acid groups, preferably carboxyl groups.

Accordingly, the present invention relates to polymers which are attached through (thio)hydantoin rings and amide groups and, optionally, ester and/or imide and/or isocyanurate groups and which are produced by reacting polyfunctional amino carboxylic acid derivatives with optionally marked organic polyiso(thio)cyanates in the presence of compounds containing carboxyl groups and, optionally polyhydroxy compounds and/or cyclic anhydride compounds and/or isocyanurate polyisocyanates, preferably in non-phenolic solvents. These polymers are especially useful as coating compositions.

For producing the inventive polymers, it is preferred to use polyfunctional, preferably difunctional, α-amino carboxylic acid derivatives corresponding to the following general formula:

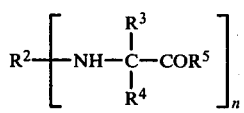

wherein $R^2$ represents a $C_2$–$C_{20}$ alkyl radical, a $C_5$–$C_{12}$ aryl radical, a $C_5$–$C_{12}$ cycloalkyl radical, a $C_6$–$C_{20}$ aryl radical, or a $C_5$–$C_{12}$ aryl or cycloalkyl radical containing one or more hetero atoms, such as N and/or O and/or S, in the ring; $R^3$ and $R^4$ the same or different represent hydrogen, a $C_1$–$C_{20}$ alkyl radical, a $C_6$–$C_{12}$ aryl radical or a $C_6$–$C_{20}$ aralkyl radical; $R^5$ represents a hydroxyl group, an amino group, a $C_1$–$C_{20}$ alkyl amino group, a $C_1$–$C_{20}$ dialkylamino group, a $C_1$–$C_{20}$ alkoxy group or a $C_5$–$C_{12}$ aroxy group which all groups may be substituted with one or more halogen atom, one or more $C_1$–$C_{10}$ alkyl and/or one or more $C_6$–$C_{12}$ aryl radicals, and n represents an integer of from 2 to 4, preferably 2. These α-amino carboxylic acid derivatives are known from U.S. Pat. No. 3,397,253.

$R^2$ preferably represents an aromatic radical, particularly those of benzene, azobenzene, naphthalene, anthracene, diphenyl, triphenyl methane, diphenyl methane and diphenyl ether. These radicals may also be substituted one or more times, for example by $C_1$–$C_{20}$ alkyl (methyl), halogen atom (chlorine), nitro, $C_1$–$C_{20}$ alkoxy (methoxy), $C_1$–$C_{20}$ dialkyl amino (dimethylamino) acyl (acetyl), $C_2$–$C_{17}$ carbalkoxy (carbomethoxy or carboethoxy) and cyano. The radicals optionally substituted once or twice by methyl and/or chlorine or once or twice by carboxyl groups are preferred, those of benzene, naphthalene, diphenyl methane or diphenyl ether being particularly preferred.

The radicals $R^3$ and $R^4$ may also be attached to one another as members of a cyclic $C_2$–$C_{20}$ alkyl radical and may be substituted by halogen atoms (chlorine or bromine), cyano, hydroxyl carbonyl, amino carbonyl, alkoxy carbonyl or aroxy carbonyl groups.

The production of the α-amino carboxylic acid derivatives used as starting compounds in accordance with the present invention is known in principle and may be carried out, for example, by reacting aromatic amines or amino carboxylic acids with halogen acetic acid or derivatives thereof or even by condensation with hydrocyanic acid and aldehydes or ketones, followed by conversion of the nitrile group, for example into carboxylic acid, ester or amide.

The acid groups are preferably introduced into the reaction mixture in the form of compounds containing at least one carboxyl group in the molecule. Hydantoin compounds of particularly high quality are obtained where the compound containing carboxyl groups is at least bi-functional, i.e. in addition to the carboxyl group, also contains another functional group, such as a carboxyl, carboxylic acid ester, cyclic anhydride, hydroxy, amino or glycine derivative group. It is preferred to use compounds corresponding to the following general formula:

$$(X)_z\text{—}R^1\text{—COOH} \quad (II)$$

wherein $R^1$ represents a $z+1$-functional, optionally substituted aliphatic (preferably $C_1$–$C_{20}$), cycloaliphatic (preferably $C_5$–$C_{12}$), aliphatic-aromatic (preferably $C_6$–$C_{20}$), aromatic (preferably $C_5$–$C_{12}$) radical or $C_5$–$C_{12}$ aryl or cycloalkyl radical containing one or more hetero atoms, such as N and/or O and/or S, in the ring;

z represent an integer of from 1 to 4, preferably 1; and

X represents a carboxyl, glycine acid derivative, hydroxy, amino, carboxyl ester or cyclic anhydride group.

Accordingly, polycarboxylic acids are preferably used as the acidic co-reactants, dicarboxylic acids being particularly preferred.

The following are examples of such polycarboxylic acids: oxalic acid, malonic acid, succinic acid, glutaric acid, adipic acid, trimethyl adipic acid, fumaric acid, maleic acid, hexahydroterephthalic acid, phthalic acid, isophthalic acid, terephthalic acid, benzene-1,3,5,-tricarboxylic acid, benzene-1,2,4-tricarboxylic acid, benzene-1,2,3,-tricarboxylic acid, napthalene-1,5-dicarboxylic acid, benzophenone-4,4'-dicarboxylic acid, diphenyl sulphone-4,4'-dicarboxylic acid, butane tetracarboxylic acid, tricarballylic acid, ethylene tetracarboxylic acid, pyromellitic acid, benzene-1,2,3,4-tetracarboxylic acid, benzene-1,2,3,5-tetracarboxylic acid, benzene-1,2,4,5-tetracarboxylic acid, naphthalene-1,4,5,8-tetracarboxylic acid, and compounds of the following formulae:

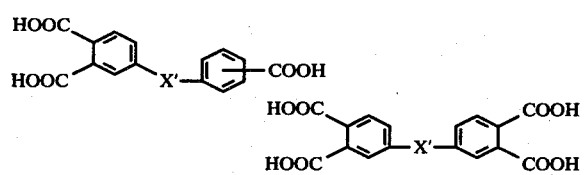

wherein X' represents

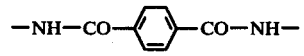

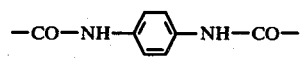

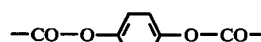

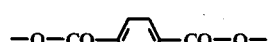

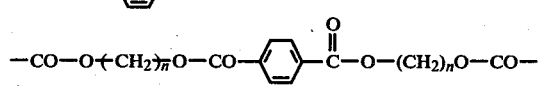

n represents an integer of from 2 to 6
—CO—(CH$_2$)$_n$O—CO—
—O—, —S—, —SO$_2$—, —CO—, —CH$_2$—CH$_2$—

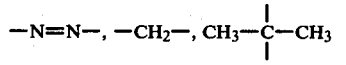

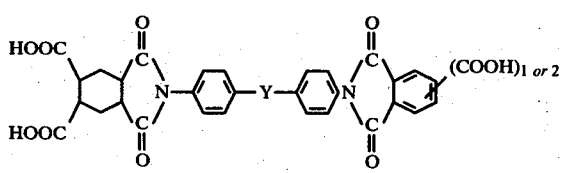

wherein

Y represents —O—, —S—, —SO₂—, —CO—, —N=N—, —CH₂—CH₂— —CH₂—, CH₃—C—CH₃

If structurally possible, the polycarboxylic acids may also be partly or completely used in the form of cyclic anhydride compounds and the carboxylic groups are formed during the reaction according to the present invention. The following are examples of such compounds:

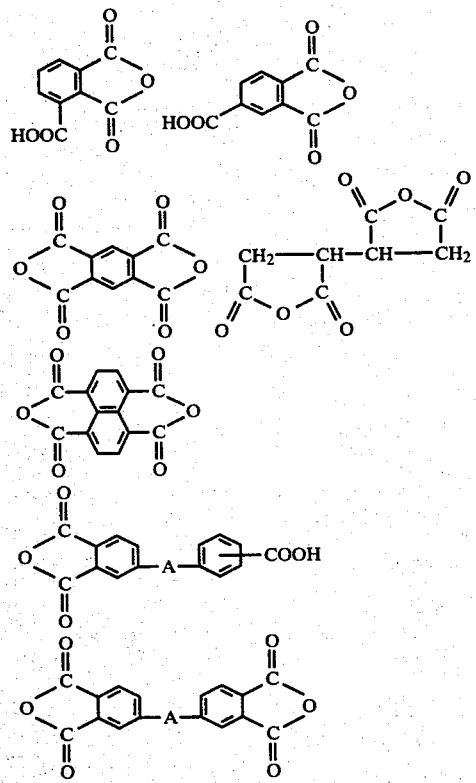

A represents

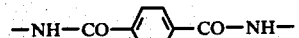
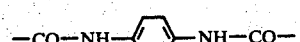
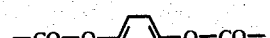

n = 2–6

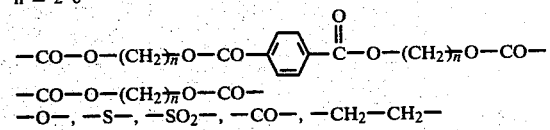
—O—, —S—, —SO₂—, —CO—, —CH₂—CH₂—

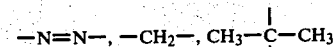

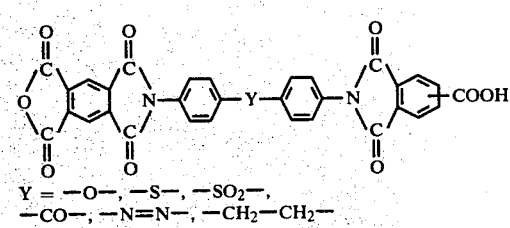

Y = —O—, —S—, —SO₂—,
—CO—, —N=N—, —CH₂—CH₂—

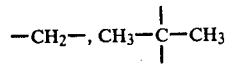

The polycarboxylic acids may also be oligomeric or polymeric compounds. Thus, it is also possible, for example, to use bis-benzene dicarboxylic acids corresponding to the following general formula:

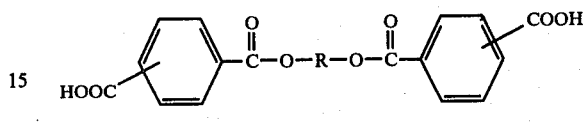

Wherein R represents an at least difunctional $C_5$–$C_{12}$ aromatic radical, a saturated or unsaturated $C_2$–$C_{20}$ aliphatic radical, a $C_5$–$C_{12}$ cycloaliphatic radical wherein aromatic, cycloaliphatic or heterocyclic ring systems and also ether, keto, ester or sulphone bridges may be present and which may optionally be substituted by one or more halogen, nitro or $C_1$–$C_{20}$ alkoxy.

The following are examples of R:

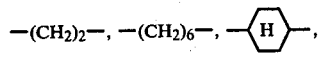
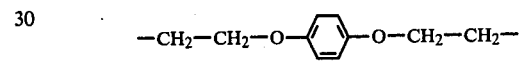
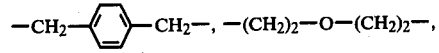
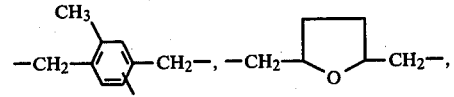
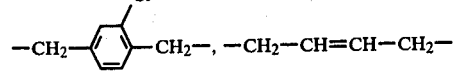
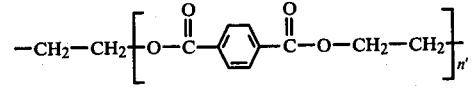

n represents an integer of from 1 to 7.

However, it is also possible to use oligomeric and/or polymeric acid carboxylic acid esters corresponding to the following general formula:

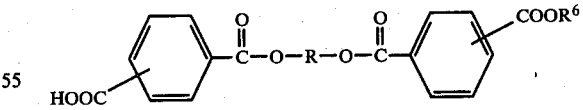

wherein R is as defined above; and $R^6$ represents an optionally substituted $C_1$–$C_{20}$ aliphatic radical, an optionally substituted $C_6$–$C_{20}$ aliphatic-aromatic radical or an optionally substituted $C_5$–$C_{12}$ aromatic radical. The substituents may be halogen, nitro, cyano, hydroxyl, $C_1$–$C_{10}$ alkoxy or $C_5$–$C_{12}$ aroxy.

The acid groups may also be used in the form of compounds which, in addition to at least one carboxyl group, contain an α-amino acid derivative group. Preferred compounds of this type correspond to the following general formula:

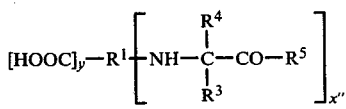

wherein $R^1, R^3, R^4$ and $R^5$ are as defined above; and y and x" independently represent integers of from 1 to 3, preferably 1 and/or 2 . These compounds are also at least partly involved in formation of the hydantoin ring.

The production of these compounds is known in principle and may be carried out in accordance with U.S. Pat. No. 3,397,253 from the corresponding α-amino carboxylic acids. To this end, it is possible, for example, to use 2-, 3- and 4-aminobenzoic acid, 4-chloro-3-aminobenzoic acid, 2- or 4- or 5-aminoisophthalic acid, 1-aminoanthraquinone-2-carboxylic acid, 4-amino-anthraquinone-1-carboxylic acid, 4-aminonapthalene-1,8-dicarboxylic acid, 2,4- and 3,4-diaminobenzoic acid, aminoacetic acid, and aminocaproic acid, which moreover may also be directly used for the process according to the invention.

Other suitable compounds containing carboxylic groups are hydroxy carboxylic acids corresponding to the following general formula:

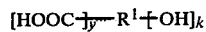

wherein $R^1$ is as defined above; and y and k independently represent integers of from 1 to 3, preferably 1 and/or 2. Examples of such compounds are hydroxy carboxylic acids, such as glycolic acid lactic acid, mandelic acid, citric acid, titaric acid, 2-, 3- or 4-hydroxy benzoic acids and also hydroxy benzene dicarboxylic acids.

The carboxylic group-containing compounds which it is particularly preferred to use are isophthalic acid and/or trimellitic acid anhydride and/or terephthalic acid, isomeric carboxyl group-containing anilino-isobutric acid derivatives and the corresponding oligo esters of these acids with small quantities of ethylene glycol, propylene glycol, glycerol, trimethylol propane and/or tris-hydroxy ethyl isocyanurate.

Aliphatic $C_2-C_{20}$ polyols are preferably used as the polyhydroxy compounds. It is particularly preferred to use diols, such as ethylene glycol, dipropylene glycol, 1,4-butane diol, 1,6-hexane diol, dimethylol propane, neopentyl glycol and bis-hydroxy ethyl hydantoin, and/or triols, such as glycerol, trimethylol propane, tris-hydroxy alkyl isocyanurate either as such or in the form of the constituent components thereof, such as cyanuric acid triaryl ester, and/or polyols and also tetrols, such as pentaerythritol.

Starting components suitable for use in accordance with the present invention are aliphatic, cycloaliphatic, araliphatic, aromatic and heterocyclic polyisocyanates (cf. Annalen 562, pages 75 to 136), such as ethylene diisocyanate, 1,4-tetramethylene diisocyanate, 1,6-hexamethylene diisocyanate, 1,12-dodecane diisocyanate, cyclobutane-1,3- diisocyanate, cyclohexane-1,3- and 1,4-diisocyanate and mixtures of these isomers, 1-isocyanato-3,3,5-trimethyl-5-isocyantomethyl cyclohexane (German Auslegeschrift No. 1,202,785), 2,4-and 2,6-hexahydrotolylene diisocyanate and mixtures of these isomers, hexahydro-1,3-and/or-1,4-phenylene diisocyanate, perhydro-2,4'- and/or-4,4'-diphenyl methane diisocyanate, 1,3- and 1,4-phenylene diisocyanate, 2,4- and 2,6-tolylene diisocyanate and mixtures of these isomers, diphenyl methane-2,4'-and/or-4,4'-diisocyanate, naphthylene-1,5-diisocyanate, triphenyl methane-4,4',4"-triisocyanate, polyphenylpolymethylene polyisocyanates of the type obtained by condensing aniline with formaldehyde, followed by phosgenation, and described, for example, in British Pat. Nos. 874,430 and 848,671, perchlorinated aryl polyisocyanates of the type described, for example, in German Auslegeschrift No. 1,157, 601, polyisocyanates containing carbodiimide groups of the type described in German Pat. No. 1, 092, 007, diisocyanates of the type described in U.S. Pat. No. 3,492,330, polyisocyanates containing allophanate groups of the type described, for example, in British Pat. No. 994,890, in Belgian Pat. No. 761,626, and in published Dutch Patent Application No. 7,102, 524, polyisocyanates containing isocyanurate groups of the type described, for example, in German Pat. Nos. 1,022, 789; 1,222,067 and 1,027,394 and in German Offenlegungsschrift Nos. 1,929, 034 and 2,004,048.

Preferred isocyanurate polyisocyanates are compounds corresponding to the following general formula:

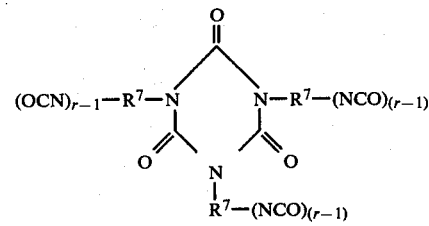

wherein $R^7$ represents the organic radical of the isocyanate compound which has still to be defined and r represents an integer of from 1 to 4. Such compounds may also be prepared either separately or in situ from corresponding organic isocyanates, for example in accordance with German Auslegeschrift No. 1,035, 362.

Other suitable starting components are polyisocyanates containing urethane groups of the type described, for example, in Belgain Pat. No. 752,261 or in U.S. Pat. No. 3,394,164, polyisocyanates containing acylated urea groups according to German Pat. No. 1,230,778, polyisocyanates containing biuret groups of the type described, for example, in German Pat. No. 1,101,394, in British Pat. No. 889,050 and in French Pat. No. 1,017,514, polyisocyanates produced by teleromisation reactions of the type described, for example, in Belgian Pat. No. 723, 640, polyisocyanates containing ester groups for the type mentioned, for example, in British Pat. Nos. 956,474 and 1,072,956, in U.S. Pat. No. 3,567,763 and in German Pat. No. 1, 231 688 and reaction products of the above-mentioned isocyanates with acetals according to German Pat. No. 1, 072, 358.

It is also possible to use the distillation residues containing isocyanate groups obtained in the commercial production of isocyanates, optionally in solution in one or more of the above-mentioned polyisocyanates. Mixtures of the above-mentioned polyisocyanates may also be used.

In addition to the polyisocyanates, it is also possible in accordance with the present invention to use small quantities of aliphatic, cycloaliphatic, aliphatic-aromatic and aromatic compounds optionally substituted by hetero atoms and containing one NCO-group in the molecule as monoisocyanates, such as alkyl isocyanates, such as ethyl, methyl, butyl, dodecyl and stearyl isocyanate, aromatic, optionally substituted monoisocyanates, such as phenyl, tolyl, isopropyl, nonyl isocyanate, nitro, alkoxy, aroxy, chloro, dichloro, trichloro, tetrachloro, pentachloro, benzyl, bromophenyl isocyanate or isocyanato-benzoic acid esters, phthalic acid esters, isophthalic acid esters, isocyanatobenzonitrile, cycloaliphatic isocyanates, such as cyclohexyl isocyanate, and unsaturated isocyanates, such as allyl, oleyl and cyclohexenyl isocyanate.

Preferred isocyanates are compounds corresponding to the following general formula:

$$R^7-(NCO)_r \qquad (III)$$

wherein $R^7$ represents a $C_2-C_{20}$ alkyl radical optionally substituted by halogen, $C_1-C_{10}$ alkyl and/or $C_5-C_{12}$ aryl, a $C_5-C_{12}$ aryl radical, a $C_5-C_{12}$ cycloalkyl radical, a $C_6-C_{20}$ alkyl-aryl radical or a $C_5-C_{12}$ aryl or cycloalkyl radical containing one or more hetero atoms, such as N and/or O and/or S; and r represents an integer of from 1 to 4, preferably from 1 to 3 and, with particular preference, 2. Aliphatic radicals containing from 2 to 12 carbon atoms or an aryl radical, such as phenyl, tolyl, naphthyl, diphenyl methane and diphenyl ether radicals, are particularly preferred.

It is preferred to use the commercially readily obtainable mixtures of tolylene diisocyanates, m-phenylene diisocyanate and phosgenated condensates of aniline and formaldehyde having a polyphenylenemethylene structure, the symmetrical compounds 4,4'-diisocyanatodiphenyl methane, 4,4'-diisocyanatodiphenyl ether, p-phenylene diisocyanate and 4,4'-diisocyanatodiphenyl dimethyl methane and also isophorone diisocyanate and hexamethylene diisocyanate.

The isocyanates may be used in free form and also partly or completely in the form of masked isocyanates which are obtained by reaction with compounds containing reactive hydrogen atoms and which react as isocyanate donors under the reaction conditions.

Preferred donors are the addition products of lactams, oximes and CH-acid compounds and also the carbamic acid esters obtained from aliphatic monohydroxy and polyhydroxy compounds, for example those corresponding to one of the following general formulae:

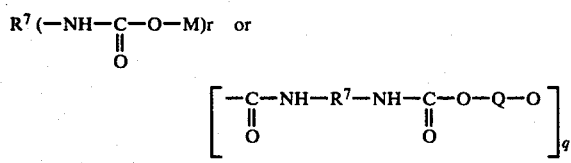

wherein $R^7$ and r are as defined above; M represents the organic radical of a monohydroxy compound; and Q represents organic radical of a bi-functional or tri-functional hydroxy compound; M and Q, which may be the same or different, each preferably represents a $C_1-C_{10}$ aliphatic radical, a $C_5-C_{12}$ cycloaliphatic radical and/or a $C_7-C_{12}$ aliphatic-aromatic radical which may be substituted by $C_1-C_{12}$ alkyl and/or $C_5-C_{12}$ aryl; and q represents an integer of from 1 to 1000, preferably from 1 to 100.

Examples of such carbamic acid esters are the carbamic acid esters of aliphatic monohydric-alcohols, such as methanol, ethanol, propanol, isopropanol, butanol, isobutanol, cyclohexanol, allyl alcohol, benzyl alcohol, and aliphatic diols or higher polyols, such as ethylene glycol, trimethylol propane, glycerol and trishydroxy ethyl isocyanuarate, also the addition products thereof with 2-pyrrolidone, caprolactam, butanone oxime, malonic ester, acetoacetic ester and acetophenone.

The isocyanate donors may either be used as such or may be produced in situ by reaction with the corresponding reactants.

Instead of the above-mentioned (poly)isocyanates, it is also possible to use the corresponding (poly)isothiocyanates as starting materials.

The hydroxy alkyl ethers used with particular preference as blocking agents and solvents in accordance with the present invention are, for example, compounds corresponding to the following general formula:

$$R^8-(OR^9)_p-OH,$$

wherein $R^8$ represents an optionally substituted $C_1-C_{20}$, preferably $C_1-C_8$, aliphatic radical a $C_5-C_{12}$, preferably $C_5-C_8$, cyaloaliphatic radical, a $C_6-C_{16}$ aliphatic-aromatic radical or a $C_5-C_{14}$ aromatic radical which may be substituted one or more times, for example by alkoxy or aroxy; $R^9$ represents a $C_2-C_{20}$ aliphatic radical; and p represents an integer of from 1 to 100, preferably from 1 to 4. According to the present invention, it is preferred to use hydroxyl alkyl ethers which contain one hydroxy group per molecule and wherein $R^9$ represents a radical containing two carbon atoms in the chain which may be substituted, for example, by alkyl, for example methyl, isopropyl, cyclohexyl, benzyl, phenyl and methoxy ethyl ethylene glycol and propylene glycol or diethylene glycol and dipropylene glycol monoether.

It is also possible in the present process to use non-phenolic solvents, such as hydrocarbons, halogenated hydrocarbons, alcohols, esters, cyclic esters, ketones, ethers, substituted amides and nitriles, for example xylenes, o-dichlorobenzene, benzyl alcohol, acetophenone, cyclohexanone, propylene carbonate, phenoxy ethanol, ε-caprolactam, ethylene glycol, butyl ether, diethylene glycol methyl ether, glycol monomethyl ether acetate, γ-butyrolactone, ε-caprolactam, benzoic acid alkyl ester, N-methyl pyrrolidone, dimethyl formamide, dimethyl acetamide, benzontrile, dimethyl sulphoxide and mixtures thereof.

In addition, aliphatic and aromatic hydrocarbons, such as cyclohexane, xylene, toluene or technical mixtures thereof, such as Solvesso 100 with solvent naphtha, are suitable for use as diluents.

However, it is not necessary to use solvents, although stoichiometric quantities of blocking agents may optionally be used.

In accordance with the foregoing observations, any polycarboxylic acids, the partial or complete esters and/or anhydrides thereof and also any known polyols are suitable and may be used for the reaction according to the present invention.

Examples of such polycarboxylic acids have been given above. They may be used either partly or completely in the form of esters of the alcohols mentioned above as blocking agents and/or partly or completely in the form of anhydrides.

The reaction of the polyfunctional amino carboxylic acid derivatives mixed with or attached to the polycarboxylic acids and/or anhydrides and/or oligoesters with the organic isocyanates, other polycarboxylic acids and/or esters thereof and/or anhydrides and polyols to form the present polymers containing hydantoin rings may be carried out in solvents, which do not react or which form loose, further-reacting addition compounds under the reaction conditions, or in bulk in an excess of one of the reaction components.

To carry out the present process, the reaction components are maintained at a temperature of from $-20°$ to $+500°$ C., preferably from $20°$ to $400°$ C. for from a few minutes to several hours in the presence or absence of solvents and/or blocking agents. The course of the reaction may be followed from the evolution of gas and the IR spectra. The characteristic bands of the present polymers, preferably for the hydantoin ring and amide structure and for the imide structure, may be clearly identified by IR spectra. The high molecular weight compounds containing hydantoin rings preferably have solution viscosities of from 300 to 500,000 mPas, preferably from 500 to 200,000 mPas, as determined, for example, on 30 percent solutions in benzyl alcohol, carbitol, $\gamma$-butyrolactone at a temperature of $25°$ C.

In general, one equivalent (val) of an organic isocyanate is used per equivalent (val) of the combination according to the present invention of polyfunctional $\alpha$-aminocarboxylic acid derivatives and carboxylic groups and/or oligoesters, although considerable deviations from these quantitative ratios are also possible to enable the property spectrum of the present polymers to be adapted to the requirements of every possible application. However, it is only advisable to use those molar radios which give products which are at least fusible and/or universally soluble in organic, preferably phenolic solvents free from hydroxyl groups. It is preferred to use at least 0.1 mole percent and at most 49 mole percent of polyfunctional $\alpha$-aminocarboxylic acid derivatives for the polycondensation reaction. For example, high molecular weight polyhydantoins, hydantoin isocyanates or hydantoin carboxylic acids or anhydrides thereof are obtained from bi-functional reactants in dependence upon the stoichiometric ratios.

Accordingly, the quantity of acid groups is measured in such a way that, in combination with the quantity of the polyfunctional $\alpha$-aminocarboxylic acid derivative, it is equivalent to the total quantity of organic isocyanate present.

On the other hand, both the organic isocyanates and also the acid groups or oligoesters may be used in any quantities, preferably in excess, and reacted either simultaneously or subsequently with optionally polyfunctional amines, optionally polyhydric alcohols, as described, for example, in the above-mentioned references, and for example ethylene glycol, dipropylene glycol, trimethylol propane, glycerol, tris-hydroxy ethyl isocyanurate and/or the combination of cyanuric acid triaryl esters and polyols and/or optionally polybasic carboxylic acids and/or esters thereof and/or anhydrides thereof, for example based on the above-mentioned polycarboxylic acids, preferably phthalic acid, isophthalic acid, terephthalic acid, trimellitic acid, pyromellitic acid and butane tetracarboxylic acid optionally together with other polyisocyanates and, optionally, polyisocyanurate polyisocyanates or donors thereof and optionally in the presence of auxiliaries and additives, such as $\epsilon$-caprolactam, and $\epsilon$-caprolactone, to form linear and/or branched hydantoin ring-containing polymers with, for example, carbamic ester, amide and/or imide groups which are characterised by high solubility, outstanding temperature resistance, high elasticity and excellent heat shock behaviour.

The condensation products according to the present invention or even the preliminary stages thereof may be mixed equally effectively with and optionally attached and/or incorporated by condensation in polyesters, preferably polyesters containing hydroxyl groups, for example preferably of maleic acid anhydride, phthalic acid anhydride and/or maleic acid, fumaric acid, succinic acid phthalic acid, isophthalic acid, terephthalic acid, trimellitic acid and/or trimellitic acid anhydride and/or esters thereof, ethylene glycol, dipropylene, glycol, glycerol, trimethylol propane and/or tris-hydroxy ethyl isocyanurate and/or the combination of cyanuric acid triaryl esters and polyols, polyethers, for example of ethylene oxide and/or bis-(hydroxy phenyl)-propane and epichlorhydrin, polyurethanes, polyamides, polyolefins, polyacetates, polyepoxides, polyimides, polyamide imides, polyester imides, polyester amide imides, polyimido polyesters and polyimide isocyanates. Alternatively, the present reaction may be carried out in the presence of these components. In every case, modified polymers are formed which, in addition to the (thio)-hydantoin rings, optionally contain additional ether, carboxylic acid ester, carbamic ester, carboxylic acid amide, imide, ester amide, ester imide, amide imide and/or ester amide imide groups.

The quantities in which these additives are used may vary within wide limits, although they are preferably used in quantities of from 10 to 500%, by weight, based on the condensate according to the present invention.

The polymerisation reactions may be further accelerated by means of known catalysts, such as bases, for example triethyl amine, N-methyl morpholine, endoethylene piperazine, and also compounds of metals, particularly iron, lead, zinc, tin, copper, manganese, cobalt, titanium, for example titanium tetrabutylate, titanium amino alcohol, iron acetyl acetonate, dibutyl tin laurate, lead acetate and zinc octoate, or phosphorus compounds, such as trialkyl phosphine.

In some cases, it is advantageous to carry out the reaction in several stages. Thus, it is possible, for example, in a first stage optionally carried out in a solvent and/or blocking agent, to prepare an adduct or condensate which is subsequently converted into the optionally high molecular weight condensation product at a higher temperature, possibly with evaporation of the solvent, by cyclisation and/or chain-extension and/or crosslinking, optionally after the addition of blocking agents. If the thus-obtained optionally high molecular weight condensation product is used for coating, it may even be applied from melts or aqueous systems or in the form of a powder.

In another embodiment of the process, isocyanate mixtures are used so that different organic isocyanates may be employed, for example in any partial stages.

Products containing optionally masked isocyanate groups may be formed during the present process. By using isocyanate mixtures, for example of polyfunctional and monofunctional isocyanates, it is possible to control the degree of polymerisation of the reaction according to the present invention. Accordingly, it is possible to obtain products having a comparable degree of polymerisation, but a lower content of optionally masked isocyanate groups by using calculated quantities of monoisocyanates. Suitable monoisocyanates are, for example, phenyl isocyanate, $\alpha$-naphthyl isocyanate, isocyanato-benzoic acid ester and isocyanato-acetic acid ester.

Occasionally the reaction is best carried out under an inert gas atmosphere, for example of nitrogen or argon. Furthermore, the reaction according to the present invention may be carried out either continuously or in batches and optionally under pressure in autoclaves to allow a higher reaction temperature to be applied.

The polymers containing hydantoin groups obtainable by the process show excellent temperature resistance and high solubility, even in preferably phenol-free solvents.

The present polymers may be used for the production of temperature-resistant coating compositions, lacquers, powders and preferably for coating heat-resistant substrates. The properties thereof may be varied within wide limits, depending on the application in question, by the addition of fillers, pigments, low molecular weight and high molecular weight components, such as polyurethanes, polyesters, polyester imides, polyimides, polyamide imides, polyester amide imides, polyamides, polyvinyl acetates, epoxides, polycyanates and silicone resins.

The polymers containing hydantoin groups, preferably polyhydantoin amides optionally modified with ester, imide and/or isocyanurate groups, are preferably used for stoving lacquers, particularly wire lacquers and electrical insulation lacquers. These lacquer binders are generally used in solvents or solvent mixtures to which a certain amount of non-solvents or diluents may additionally be added in accordance with the present invention. These diluents are aliphatic, preferably aromatic hydrocarbons and optionally, lower alcohols, for example cyclohexane toluene, xylene, technical mixtures thereof, such as Solvesso and solvent naphtha, also ethanol, butanol and amino alcohol.

The solids content of the possible lacquer solutions may vary within wide limits and is determined by the solubility of the binders and also by the particular application envisaged. The solids content is preferably from 20 to 70%, by weight. The polymers containing hydantoin groups according to the present invention show excellent solubility, even in preferably non-phenolic solvents, and may be processed using conventional lacquering machines and also in the form of impregnating lacquers having solids contents of up to 60%, optionally even from pure melts or in the form of powders.

Furthermore, the hardening reaction of the coating composition is also accelerated by addition of the above-mentioned catalysts, i.e. the reaction time is shortened or the stoving temperature is reduced for the same stoving time. In this way, it is possible to obtain complete hardening of the lacquer film, even in particularly high-speed wire-lacquering machines.

EXAMPLE 1

223.2 g of 3-(N-ethoxy carbonyl methyl)-amino benzoic acid are dissolved at approximately 100° C. in 300 g of γ-butyrolactone. At upwards of from 45° to 60° C., the resulting solution is mixed with a solution of 250.2 g of 4,4'-diisocyantodiphenyl methane in 300 g of toluene, followed by stirring for 3 hours at from 25° C. to 35° C. Following the addition of 0.5 g of endo-ethylene piperazine, the mixture is slowly heated to from 150° to 160° C., ethanol/toluene/$CO_2$ being given off. This is followed by condensation for about 6 hours at 200° C. As its viscosity increases, the reaction mixture is diluted with 595 g of γ-butyrolactone. The solution obtained has a viscosity of 2300 mPa.s at 20° C.

In a wire-lacquering machine equipped with stripping jets and a stoving tunnel 4 meters long, a 0.7 mm diameter copper wire is lacquered to an increase in diameter of from 0.755 to 0.7600 mm at a take-off rate of 10 meters per minute.

The wire thus lacquered has a softening temperature of 380° C. and a heat shock of 260° C. (own diameter) and, despite excellent elasticity, a film hardness of 5 H (DIN 46 453).

The excellent adhesion and flexibility remain intact, even after ageing at relatively high temperatures. Thus, even after ageing for 14 days at 200° C., the wire may still be wound around its own diameter without any cracks appearing in the lacquer film.

EXAMPLE 2

223.3 g of 3-(N-ethoxy carbonyl methyl)-amino benzoic acid are dissolved at approximately 100° C. in 300 g of γ-butyrolactone. At upwards of from 45° to 60° C., 325.3 g of 4,4'-diisocyanatodiphenyl methane are added to the resulting solution, followed by stirring for 3 hours at from 25° to 35° C. After the addition of 0.5 g of endo-ethylene piperazine, the mixture is slowly heated to from 150° to 160° C., ethanol/$CO_2$ being given off. This is followed by condensation for 5 hours at 200° C. As its viscosity increases, the mixture is diluted with at most 200.0 g of benzoic acid methyl ester. However, it is only diluted after 5 hours at 200° C. with 285 g of benzyl alcohol, followed by homogenisation for about 2 hours at approximately 200° C.

Viscosity of the 40% solution: 7240 mPa.s/20° C.

The approximately 40% oligohydratoin lacquer solution is diluted with 1612 g of cyclohexane, followed by the addition of 1075 g of a polyester of 4.0 moles of dimethyl terephthalate, 0.8 mole of trimellitic acid anhydride, 0.9 mole of terephthalic acid, 2.0 moles of tris-(2-hydroxy ethyl)-isocyanuarate, 0.5 mole of glycerol, 7.0 moles of ethylene glycol, 200 g of Solvesso, 3.0 g of lead acetate and 1.0 g of butyl titanate, having a hydroxyl group content of approximately 4.5%, by weight. The mixture is homogenised for 1 hour at from 180° to 200° C., followed by the addition at from 100° to 80° C. of a solution of 16 g of titanium tetrabutylate in 32 g of acetyl acetone. Finally, the mixture is stirred for 1 hour at from 80° to 70° C.

The approximately 40% lacquer solution has a viscosity of approximately 1720 cP/20° C., 1.0 mm diameter copper wires are coated with it in a 4 meter lacquering furnace at a rate of 8 meters per minute, followed by stoving at temperatures of up to 420° C. The lacquering film which shows excellent electrical insulation properties, is relatively hard, but elastic and resistant to chemicals, has a softening temperature of at least 330° C. and a heat shock resistance of at least 240° C.

EXAMPLE 3

33.2 g of isophthalic acid and 16.6 g of terephthalic acid are mixed with 700 g of acetophenone, followed by tempering for approximately 5 minutes at from 170° to 180° C. After the addition of 50° C. of 278.95 g of N,N'-bis-(2-methoxy-carbonyl propyl-2-)-4,4'-diaminodiphenyl methane, the mixture is stirred at from 30° to 50° C. with a solution of 250.2 g of 4,4'-diisocyanatodiphenyl methane in 300 g of toluene. After approximately 5 hours at from 30° to 40° C., 0.5 g of endo-ethylene piperazine are added, followed by slow heating through 60°, 80°, 120°, 150° to 175° C. with elimination of in particular CO$_2$, methanol and toluene. Finally, the mixture is condensed for 1 hour at 190° C., for 3 hours at from 200° to 205° C. and for 2 hours at from 205° to 210° C. As its viscosity increases, the mixture is diluted with 485 g of benzoic acid methyl ester, followed by stirring for about 1 hour at from 170° to 150° C.

The approximately 30% lacquer solution has a viscosity of 65,000 cP at 20° C. and is diluted to approximately 20% using benzoic acid methyl ester.

The 0.7 mm diameter copper wire lacquered under the conditions described in Example 1 has a softening temperature of >380° C. (DIN 46 453), a heat shock of >260° C., a scraping resistance equivalent to approximately 50 double strokes, a lacquer film hardness (DIN 46 453) of 4 H, an electric strength of >10 kV and a high resistance to chemicals.

EXAMPLE 4

33.2 g of isophthalic acid and 8.3 g of terephthalic acid are mixed under nitrogen at 25° C. with 300 g of γ-butyrolactone, 200 g of benzoic acid ethyl ester and 200 g of toluene, followed by the addition of 298.9 g of N,N'-bis-(2-methoxy carbonyl propyl-2)-4,4'-diaminodiphenyl methane. At upwards of from 25° to 35° C., the mixture is stirred with 325.3 g of 4,4'-diisocyanatodiphenyl methane. After stirring for 3 hours at approximately 50° C., 0.5 g of endo-ethylene piperazine are added and the mixture rapidly heated to from 150° to 160° C. with elimination of in particular methanol, toluene and CO$_2$. Finally the mixture is condensed for approximately 5 hours at from 200° to 205° C. As its viscosity increases, the mixture is diluted with 491 g of benzyl alcohol, followed by stirring for about 1 hour at from 200° to 205° C.

The approximately 40% oligohydantoin lacquer solution has a viscosity of 8200 cP/20° C. It is diluted using 1000 g of benzyl alcohol, 500 g of benzoic acid methyl ester and 480 g of acetophenone, followed by the addition of 1321 g of a polyester of 4.7 moles of dimethyl terephthalate, 1.0 mole of terephthalic acid, 1.9 moles of tris-(2-hydroxy ethyl)-isocyanurate, 0.6 mole of trimethylol propane, 10.0 moles of ethylene glycol, 300 g of Solvesso, 2.0 g of lead acetate and 1.0 g of butyl titanate having a hydroxyl group content of approximately 4.5%, by weight. The mixture is then homogenised for 1 hour at from 180° to 200° C., followed by the addition at from 100° to 80° C. of a solution of 20 g of titanium tetrabutylate in 40 g of acetyl acetone. Finally, the mixture is stirred for 1 hour at from 70° to 80° C.

The approximately 40% lacquer solution has a viscosity of approximately 1450 cP/20° C.

0.7 mm diameter copper wires coated with it in a 4 meter lacquering furnace at a rate of 9 meters per minute having a softening temperature of at least 330° C. and a heat shock of at least 260° C.

EXAMPLE 5

74.8 g of isophthalic acid are mixed under nitrogen with 150 g of γ-butyrolactone and 200 g of toluene, followed by the addition of 298.9 g of N,N'-bis-(2-methoxy carbonyl propyl-2)-4,4'-diaminodiphenyl methane. At upwards of from 35° to 40° C., the mixture is stirred with 375.4 g of 4,4'-diisocyanatodiphenyl methane. After stirring for approximately 12 hours at 25° C., a solution of 150 g of 4,4'-diisocyanatodiphenyl methane in 100 g of toluene is added at from 30° to 40° C. The mixture is then stirred for 1 hour at 50° C., followed by the addition of 0.5 g of endo-ethylene piperazine and 200 g of terephthalic acid dimethyl ester. The mixture is then homogenised and rapidly heated through 160° C. to 200° C. with elimination, optionally under 200 torr, of CO$_2$, methanol and toluene. This is followed by condensation for approximately 3 hours at from 200° to 205° C. At upwards of 170° C., 345.8 g of trimellitic acid anhydride are added, the mixture is homogenised and then condensed for 1 hour at 190° C. for 3 hours at 200° to 205° C. and for 1 hour at from 205° to 215° C. 518.5 g of terephthalic acid dimethyl ester, 653.0 g of tris-(2-hydroxy ethyl)-isocyanurate, 3.0 g of lead acetate, 1.0 g of butyl titanate and 50 g of xylene are then added to the mixture at approximately 170° C., after which the mixture is homogenised and then condensed for about 6 hours at a temperature rising from 170° C. to from 200° to 220° C. until no more distillate passes over below 150° C. Finally, 184 g of ethylene glycol and 46 g of glycerol are added at 170° C., followed by repeated condensation at from 200° to 220° C. until no more distillate passes over below 150° C. The mixture is then condensed at from 210° to 230° C. first directly and then under approximately 200 Torr to such an extent that the resin diluted to approximately 50% using γ-butyrolactone has a viscosity of approximately 12,000 cP at 20° C. For the wire lacquering test, the mixture was diluted with 2270 g of ε-caprolactone at from 150° to 120° C., a solution of 12 g of titanium tetrabutylate in 24 g of acetyl acetone added and the mixture homogenised for approximately 1 hour at from 120° to 100° C.

The approximately 50% lacquer solution has a viscosity of 11,300 cP/20° C. and, for lacquering, is further diluted to 35% using a mixture of benzyl alcohol/solvent naphtha in a volume ratio of 2:2.

A 0.7 mm diameter copper wire lacquered in a 4 meter furnace at a speed of 9 meters per minute was tested in accordance with DIN 46 453. It has a softening temperature of at least 330° C., a heat shock of at least 260° C., a scraping resistance equivalent to at least 90 double strokes, a film hardness of at least 5 H, an insulating strength of at least 9 kV and a high resistance to chemicals.

EXAMPLE 6

8.3 g of isophthalic acid and 76.8 g of trimellitic acid anhydride are added under nitrogen to 800.0 g of a solution of N,N'-bis-(2-methoxy carbonyl propyl-2)-4,4'-diaminodiphenyl methane in a mixture of γ-butyrolactone (40%) and toluene (60%) (N-content 2.63%), followed by the addition at upwards of 30° C. of 375.3 g of 4,4'-diisocyanatodiphenyl methane. After homogenisation for at least 1 hour at from 30° to 45° C., 0.5 g of triethylene diamine are added, after which most of the toluene is eliminated by heating to approximately 180° C. After about 30 minutes at 180° C., 150.0 g of 4,4'-diisocyanatodiphenyl methane, 345.8 g of trimellitic acid anhydride and 200.0 g of acetophenone are introduced at about 120° C. and the mixture maintained at 200° C. for about 4 hours. Finally, 175.0 g of terephthalic acid dimethyl ester, 271.2 g of tris-(2-hydroxy ethyl)-isocyanurate, 1.0 g of butyl titanate and 3.0 g of lead acetate are added at from 170° to 180° C., followed by the addition after about 4 hours at 200° C. of 370.0 g of ethylene glycol. The mixture is then heated for 2 hours to 220° C.

1665.0 g of a brittle resin having a solids content of approximately 85.6% and a viscosity of 26,000 cP, as measured on a 50% by weight solution in butyrolactone at 20° C., are obtained.

1050 parts, by weight, of the thus-obtained resin are dissolved in 1200 parts, by weight, of γ-butyrolactone. 750 parts, by weight, of solvent naphtha are then slowly added with stirring, after which 1.5 parts, by weight, of titanium tetrabutylate, stabilised beforehand by brief heating in approximately 10 cc of cresol, are added to the mixture.

A 0.7 mm diameter wire is lacquered in a wire lacquering machine equipped with stripping jets (furnace length 5 meters) to an increase in diameter of approximately 50 μm (lacquering speed 18 meters per minute).

The wire thus lacquered has an external fibre elongation of more than 88%, a heat shock resistance of >200° C. and a softening temperature of >320° C.

EXAMPLE 7

(a) Under the conditions of Example 6, a total of 310.7 g of terephthalic acid dimethyl ester and, instead of the tris-(2-hydroxy ethyl)-isocyanurate, a total of 336.0 g of a mixture of 356.0 g of tris-phenoxy triazine and 350.0 g of ethylene glycol, from which approximately 370.0 g of phenol had been removed beforehand over a period of about 2 hours at from 150° to 170° C. under approximately 200 Torr, are reacted for otherwise the same quantities of the reaction components.

Approximately 1875.0 g of a brownish-red solid resin having a solids content of 89.6% by weight and a viscosity of 45,800 mPa.s, as measured on a 50% by weight solution in butyrolactone at 20° C. are obtained.

(b) Under the conditions of Example 7(a), 406.4 g of terephthalic acid-bis-glycol ester are used instead of terephthalic acid dimethyl ester for otherwise the same quantities of the reaction components and 1804.0 g of a brittle, brownish-red resin are obtained under the reaction conditions of Example 6.

The resin has a solids content of 91.5% and a viscosity of 52,400 mPa.s, as measured on a 50%, by weight, solution in butyrolactone at 20° C.

The resins obtained in accordance with (a) and (b) are diluted with butyrolactone to a solids content of 20%.

Copper wires 0.7 mm in diameter are lacquered under the conditions described in Example 1 and tested in accordance with DIN 46 453.

Lacquered wires having softening temperatures of >330° C., a heat shock resistance of >200° C. and an external fibre elongation of >88% are obtained in both cases.

EXAMPLE 8

A total of 350.3 g of 4,4'-diisocyanatodiphenyl methane is added in portions under nitrogen at from 25° to 45° C. to a suspension of 299.0 g of N,N'-bis-(2-methoxy carbonyl propyl-2)-4,4'-diaminodiphenyl methane, 150.0 g of γ-butyrolactone, 300.0 g of toluene 8.3 g of isophthalic acid and 57.6 g of trimellitic acid anhydride. After stirring for about 4 hours at from 40° to 45° C., 345.8 g of trimellitic acid anhydride are added at 60° C. After another hour at 60° C., 1.0 g of triethylamine diamine, 120.0 g of 4,4'-diaminodiphenyl methane, 250.0 g of terephthalic acid dimethyl ester and 50.0 g of γ-butyrolactone are added at from 60° to 70° C. After heating to 200° C., the mixture is then condensed for from 4 to 6 hours at from 200° to 230° C. 518.2 g of terephthalic acid dimethyl ester are then added at about 180° C., followed by the addition at from 150° to 140° C. to 653.0 g of tris(2-hydroxy ethyl)isocyanurate, a catalytic quantity of lead acetate and butyl titanate, 46.0 g of glycerol and 186.0 g of ethylene glycol. The mixture is then condensed for from 6 to 8 hours at from 200° to 230° C., the condensation products and additives being distilled off.

2694.0 g of a brittle, clear brown-red resin are obtained, this resin having a solids content of 90.3%, by weight (according to DIN) and a viscosity of 22,000 mPas, as measured on a 50%, by weight, solution in γ-butyrolactone at 20° C.

900 parts, by weight, of the resin obtained are dissolved with heating in 1410 parts, by weight, of benzyl alcohol, followed by the addition with intensive stirring of 600 parts, by weight, of xylene. After cooling, 6 parts, by weight, of titanium tetrabutylate (stabilised beforehand by brief boiling in 10 cc of cresol) are added.

A 0.7 mm diameter copper wire is lacquered with this solution to a diameter of 0.75 mm under the conditions of Example 7. Testing in accordance with DIN 46 453 shows that the lacquered wire has a heat shock resistance of >200° C. and softening temperatures above 330° C. The rise in the tan δ curve (temperature) occurs at 185° C.

EXAMPLE 9

350.3 g of 4,4'-diisocyanatodiphenyl methane are added under nitrogen at from 25° to 60° C. to a suspension of 299 g of N,N'-bis-(2-methoxy carbonyl propyl-2)-4,4'-diaminodiphenyl methane, 150 g of γ-butyrolactone, 300 g of toluene, 8.3 g of isophthalic acid and 57.6 g of trimellitic acid anhydride. After stirring for 1 hour at 60° C., 345.8 g of trimellitic acid anhydride are added, 1.0 g of triethylene diamine introduced and the mixture stirred for about 1 hour at 60° C. Following the addition of 120 g of 4,4'-diaminodiphenyl methane, 200 g of terephthalic acid dimethyl ester and 50 g of γ-butyrolactone, the mixture is heated to from 200° to 230° C. with removal of the toluene by distillation and condensed at that temperature for from 4 to 6 hours. 382 g of terephthalic acid dimethyl ester are then stirred in at 180° C., followed by the addition with stirring at 150° C. of 734.1 g of tris-(2-hydroxy-ethyl)-isocyanurate and 275 g of a polyester of 1.0 mole of terephthalic acid, 0.38 mole of glycerol and 0.72 mole of glycol (hydroxyl group content about 6.0%, by weight) and catalytic quantities of lead acetate and butyl titanate.

After final condensation for from 4 to 6 hours at from 200° to 220° C., 2724 g of a clear, light red brown brittle solid resin are obtained, this resin having a solids content of 90.3% by weight (according to DIN) and a viscosity of 22070 mPa.s, as measured on a 50% by weight solution in Y-butyrolactone at 20° C.

A 0.7 mm diameter copper wire is coated with the molten resin (temperature approximately 170° C., melt viscosity 2000 mPa.s) in known manner in a melt coating machine to a thickness of 0.75 mm (coating speed 8 meters per minute) and stoved at 410° C. The light brown lacquered wire has a very hard surface, is resistant to chemicals and shows high elasticity, electric strength and heat shock resistance. Its softening point is above 330° C.

EXAMPLE 10

800 parts, by weight, of the resin produced in accordance with Example 6 are dissolved in 1200 parts, by weight, of a mixture of cresol and xylene (2:1), followed by the addition of 2 parts, by weight, of titanium tetrabutylate, stabilised before hand by heating with cresol (approximately 10 ml) 1000 parts, by weight, of a 35% by weight solution of a polyester of terephthalic acid:-glycol:glycerol (molar ratio 1:0.7:0.4) having an acid number of approximately 4 and an OH content of approx. 6% by weight in cresol/xylene (volume ration 1:1) are then added to the solution. The resulting solution contains 1.5% by weight of titanium butylate, based on the polyester.

A 0.7 mm diameter copper wire is lacquered to a thickness of 0.750 mm with the combined lacquer solutions in the wire lacquering machine described in Example 6. A lacquered wire having a heat shock resistance of >180° C. and a softening temperature of >300° C. is obtained within the wire-lacquering speed range of from 18 to 26 m/minute. The lacquer film has a pencil hardness of from 3 H to 2 H.

EXAMPLE 11

16.6 g of terephthalic acid and 38.4 g of trimellitic acid anhydride are heated to 180° C. in 300 g of butyrolactone, all the trimellitic acid anhydride and some of the terephthalic acid passing into solution. After cooling, 199 g of 4,4'-bis-(methoxy carbonylisopropylamino)-diphenyl methane are dissolved, followed by the addition at from 35° to 40° C. of 225 g of 4,4'-diisocyanatodiphenyl methane. On the following day, 0.5 g or triethylene diamine are added, the mixture heated to 200° C. and then condensed to completion in 6 hours at a temperature of 200° C., the methanol and carbon dioxide formed being removed. After dilution with 682 g of butyrolactone, 1400 g of a 30% by weight lacquer solution exhibiting the characteristic bands for hydantoins at 1720–1775 cm$^{-1}$ and for amides at 1680 cm$^{-1}$ are obtained. After dilution with butyrolactone to 15%, by weight, the lacquer solution has a viscosity ($\eta_{25}$) of 470 mPas.

Further dilution with butyrolactone gives a 22% by weight lacquer solution with which a 0.7 mm diameter copper wire is lacquered in a stoving furnace under the conditions described in Example 2. A lacquer film having a softening temperature of >330° C., a heat shock resistance of 260° C. and an abrasion resistance (NEMA) of 20 is obtained at a lacquering speed of 10 meters per minute.

We claim:

1. A polymer attached through (thio)hydantoin rings and amide groups obtained by reacting
   (a) polyfunctional amino carboxylic acids, its amide or its ester, with
   (b) polyiso(thio)cyanates which are masked or unmasked and a compound containing at least one carboxylic group or at least one carboxylic group together with at least one additional moiety selected from polyhydroxy, cyclic anhydride and isocyanurate polyisocyanates,
   with the reacting proceeding with or without a non-phenolic solvent.

2. Polymers as claimed in claim 1 wherein as compound containing at least one carboxylic group a compound of the general formula is used:

$$(X)_z\text{—}R^1\text{—}COOH$$

wherein
   $R^1$ represents a $z+1$-functional, optionally substituted aliphatic, cycloaliphatic, aliphatic aromatic, aromatic radical or $C_5$–$C_{12}$ aryl or cycloalkyl radical containing one or more hetero atoms in the ring;
   z represents an integer of from 1 to 4, and
   X represents a carboxyl, glycine acid derivative, hydroxy, amino, carboxyl ester or cyclic anhydride group.

3. A polymer as claimed in claim 2, wherein $R^1$ represents an optionally substituted aliphatic radical with $C_1$–$C_{10}$ cycloaliphatic radical with $C_9$–$C_{12}$, aliphatic aromatic radical with $C_6$–$C_{20}$, aromatic radical with $C_5$–$C_{12}$ or a $C_5$–$C_{12}$ aryl or cycloalkyl radical containing N and/or Q and/or S hetero atoms in the ring and z=1.

4. A Polymer as claimed in claim 1, wherein the carboxylic group-containing compound is isophthalic acid and/or trimellitic acid anhydride and/or terephthalic acid, an isomeric carboxyl group-containing anilinoisobutric acid derivative or the corresponding oligo ester of these acids with small quantities of ethylene glycol, propylene glycol, glycerol, trimethylol propane and/or tris-hydroxy ethyl isocyanurate.

5. Polyhydantoin amide esters obtained as claimed in claim 1.

6. Lacquer mixtures for lacquering wires, containing a polymer as claimed in claim 1.

7. Coating compositions containing the polymer claimed in claim 1.

8. Lacquer mixtures, containing a polymer as claimed in claim 1.

9. Lacquer mixtures as claimed in claim 6 having a solid content of from 20 to 70% by weight.

* * * * *